US008782157B1

(12) United States Patent  
Hansen

(10) Patent No.: US 8,782,157 B1
(45) Date of Patent: Jul. 15, 2014

(54) DISTRIBUTED COMMENT MODERATION

(71) Applicant: Robert Hansen, Austin, TX (US)

(72) Inventor: Robert Hansen, Austin, TX (US)

(*) Notice: Subject to any disclaimer, the term of this patent is extended or adjusted under 35 U.S.C. 154(b) by 0 days.

(21) Appl. No.: 13/740,126

(22) Filed: Jan. 11, 2013

(51) Int. Cl.
*G06F 15/16* (2006.01)
*H04L 29/06* (2006.01)
*H04L 12/58* (2006.01)

(52) U.S. Cl.
CPC ............ *H04L 63/1433* (2013.01); *H04L 51/12* (2013.01); *H04L 12/585* (2013.01); *H04L 63/1441* (2013.01)
USPC .......................................... 709/206; 709/207

(58) Field of Classification Search
CPC ... H04L 63/1433; H04L 51/12; H04L 12/585; H04L 63/1441
USPC .......................................... 709/205, 206, 207
See application file for complete search history.

(56) References Cited

U.S. PATENT DOCUMENTS

| | | | | |
|---|---|---|---|---|
| 7,634,543 | B1* | 12/2009 | Van Zant et al. | 709/206 |
| 8,271,266 | B2* | 9/2012 | Gallagher et al. | 704/10 |
| 2005/0204404 | A1* | 9/2005 | Hrabik et al. | 726/22 |
| 2007/0256033 | A1* | 11/2007 | Hiler | 715/860 |
| 2007/0266079 | A1* | 11/2007 | Criddle et al. | 709/203 |
| 2008/0313011 | A1* | 12/2008 | Rose et al. | 705/10 |
| 2009/0112608 | A1* | 4/2009 | Abu-Hakima et al. | 705/1 |
| 2009/0167553 | A1* | 7/2009 | Hong et al. | 340/825.29 |
| 2010/0191819 | A1* | 7/2010 | Alspector et al. | 709/206 |
| 2010/0269168 | A1* | 10/2010 | Hegli et al. | 726/11 |
| 2011/0111862 | A1* | 5/2011 | Allen et al. | 463/42 |
| 2011/0137845 | A1* | 6/2011 | Ward | 706/50 |
| 2011/0289432 | A1* | 11/2011 | Lucas | 715/753 |
| 2012/0089681 | A1* | 4/2012 | Chowdhury et al. | 709/206 |
| 2012/0136985 | A1* | 5/2012 | Popescu et al. | 709/224 |
| 2012/0158632 | A1* | 6/2012 | Grenier et al. | 706/45 |
| 2013/0055089 | A1* | 2/2013 | Gundotra et al. | 715/733 |
| 2013/0091223 | A1* | 4/2013 | DeLuca et al. | 709/206 |

\* cited by examiner

*Primary Examiner* — Hieu Hoang
(74) *Attorney, Agent, or Firm* — Mark R. Hennings

(57) ABSTRACT

A distributed comment moderation service is arranged to help mediate the moderation of blog comments using a (for example) centralized moderation queue. The centralized moderation queue can be used to automatically (including semi-automatically) outsource blog comment moderation to third party resource providers. The distributed comment moderation service is optionally arranged to provide an indication of an assessment of the quality of the third party resource providers.

19 Claims, 6 Drawing Sheets

DISTRIBUTED COMMENT MODERATION

BACKGROUND

Network-enabled applications are applications that use communication networks to share information between various devices, each of which might be operated by the same or different user(s). The network-enabled applications include applications such as browser engines, messaging interfaces, remote desktops, and the like that allow users to easily browse, select, and manipulate items being viewed using a network-enabled application. The network-enabled application receives one or more communications (such as code for instantiating webpages) from a service provider that is often encoded in the form of a language (such as the hypertext markup language HTML), which contains elements that describe the structure and functionality of the content that is received by the content user.

The networked-enabled application are often used to access blogs ("web logs") and websites that accept user comments, which provide a forum for users (and the blog host) to provide comments on a posting by a blog and/or website host, for example. Thus, the blog (which term, as used herein, includes the meaning of websites, HTML markup forums, wikis, "blikis" (blog-wikis), and the like that accept user comments) provides a collective forum in which to conduct a multi-party discussion about a blog posting (including the original blog posting by the blog host) as well as the attendant comments that are posted by interested parties having access to the blog. Often, the discussion is centered on (or around) a topic of mutual interest to the participants who post to the blog.

However, certain third parties, who gain access to a blog (through overt or covert means), attempt to use postings to a blog to further the interests of the poster, as compared with participating in and serving the collective interests of the blog audience as a whole. Such adverse posts are variously described as "high jacking threads," "posting 'spam'" (where voluminous postings to various blogs are made with the hope that at least some of it will "stick"), "posting (age-) inappropriate content," and the like. Thus, one abuser of the blog commenting facility is capable of consuming a relatively large portion time of multiple blog users while only expending a relatively very little amount of personal time. The problem is compounded when multiple such-abusers post adverse posts to a same blog (or multiple different blogs).

The incidence of the adverse posts can be so high that valid users of the blog are deterred from participating in the blog, which is often detrimental to the purpose for which the blog was established. Also, a high incidence of the adverse posts to a particular blog can cause the blog to be ranked poorly in by typically used search engines. Attempts by administrators to block out adverse posters such as "web-bots" (or "bots") often entail extra burdens upon users and administrators alike who, in an attempt reduce automated adverse postings, use challenge-response tests such as the CAPTCHA (Completely Automated Public Turing test to tell Computers and Humans Apart) test.

Blog moderators often attempt to "clean up" and remove adverse posts (and/or undesired contents of the adverse posts). However, the greater the popularity of a blog, the greater the likelihood of attracting such adverse posts, and the difficulty of moderating such posts also increasingly compounds.

DETAILED DESCRIPTION

The following discussion is directed to various exemplary embodiments of the disclosure. Although one or more of these exemplary embodiments may be preferred, the exemplary embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical, optical and/or wireless connection. Thus, if a first device couples to a second device, that connection can be made through a direct connection, or through an indirect connection via other devices and connections.

The term "domain" as used herein refers to either a domain or a portion of the domain ("subdomain") if any. Thus, the term "subdomain" can be used to refer to a portion of the "domain." A subdomain can be, for example, a domain name system (DNS) server record. For example, the name "www.example.com" can be used in a localized context to refer to a domain (notwithstanding the fact that "www.example.com" is itself a subdomain of "example.com"). While net-enabled applications such as browsers follow a "same origin" policy and tend to use the longer version "www.example.com" as an origin domain name, the net-enabled applications also use the shorter version "example.com" for certain purposes (such as for cookies that are set with the domain switch). Thus all subdomains of the domain "example.com" include "no-subdomains" (such as "http://example.com/" and "http://whatever.example.com/") and include the more-specific subdomains (such as www.example.com). The term "render" can be used to describe a change rendered in the logical structure of a Document Object Model (DOM) as well as a graphical rendering of the DOM element. The term "portion" means an entire portion or a portion that is less than the entire portion.

Figure 1:
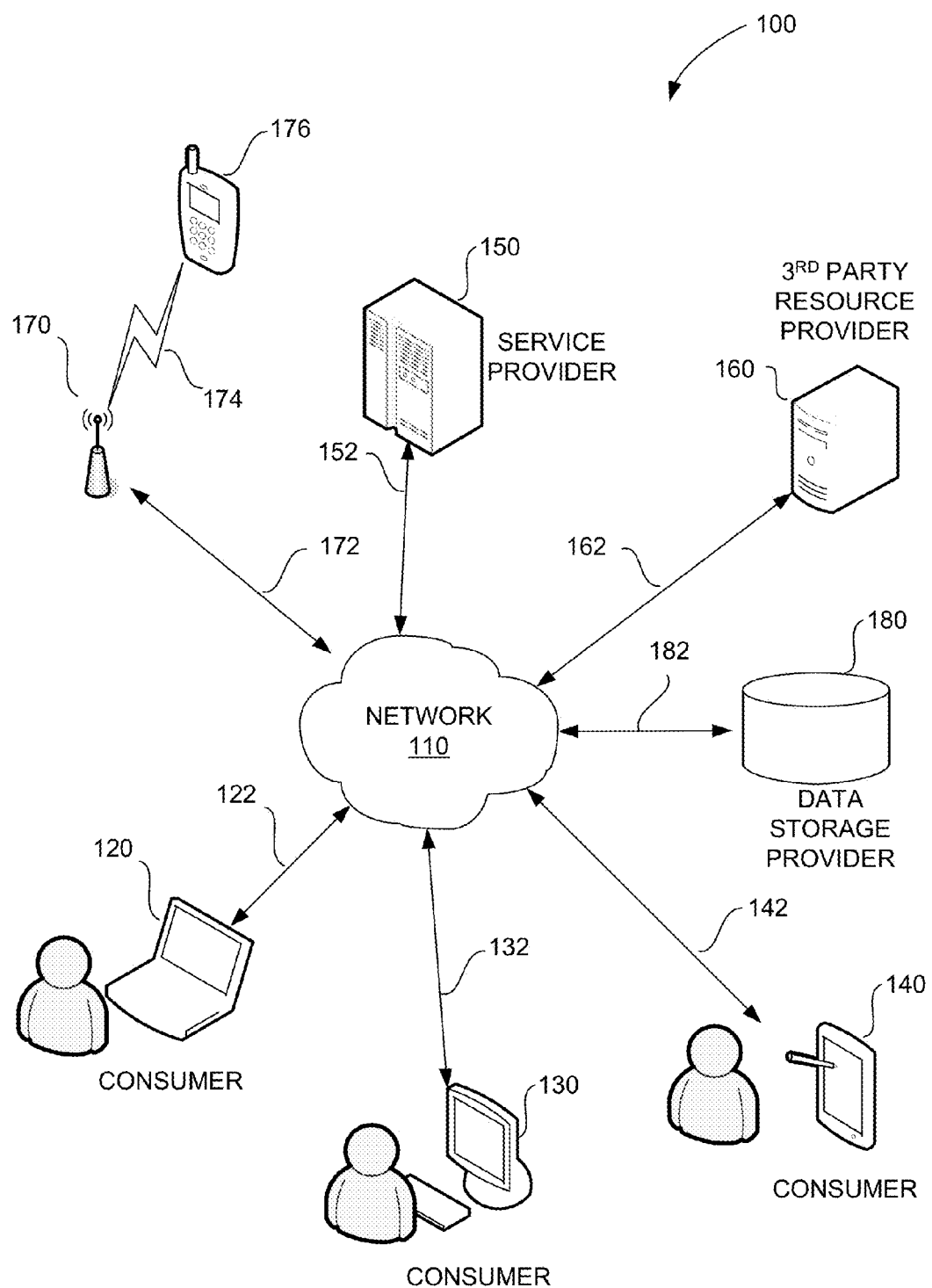
FIG. 1 is a network diagram illustrating a network that is suitable for practicing aspects of distributed comment moderation in accordance with exemplary embodiments of the disclosure.

FIG. 1 is a network diagram illustrating a network that is suitable for practicing aspects of distributed comment moderation in accordance with exemplary embodiments of the disclosure. Network system 100 includes consumer 120, 130, and 140 (machines, for example), service provider 150, third party resource provider 160, cellular communications provider 170, and data storage provider 180. Consumers 120, 130, and 140 access and communicate with network 110 using communication links 122, 132, and 142 respectively. Each of the consumers 120, 130, and 140 can be (or internally provide functions of) the (illustrative) computing device 200 discussed below with reference to FIG. 2.

Network 110 typically includes a publically accessible network such as the Internet, but other networks (including private networks) can be used. Thus, network 110 is typically a collection of networks (and gateways) that typically use a TCP/IP (transmission control protocol/Internet protocol) suite of protocols for packet-based communications. The Internet typically employs high-speed data communication lines between major nodes or host computers, but even bandwidth between the major nodes is subject to degradation through satellite outages, hardware faults, denial of service attacks, oversubscription of services, and the like. The network connections are shown for the purpose of illustration, and other ways of establishing a communications link between computers (such as using firewalls, as discussed below) can be used.

Consumers 120, 130, and 140 access the network 110 to access networked service providers of services such as service provider 150, third party resource provider 160, cellular communications provider 170, and data storage provider 180. Service provider 150 accesses network 110 via communication link 152, whereas third party resource provider 160 accesses network 110 via communication link 162. Cellular communications provider 170 accesses network 110 via communication link 172 and provides, for example, further connectivity to cellular devices 176 via a cellular network 174. Data storage provider 180 accesses network 110 via communication link 182 to provide, for example, secure backup systems for consumer 120 data. The actual data processing systems of network system 100 may include additional servers, clients, peers, and other devices not illustrated. Each of the service provider 150, third party resource provider 160, cellular communications provider 170, cellular devices 176, and data storage provider 180 can be (or internally provide functions of) the (illustrative) computing device 200 discussed below with reference to FIG. 2.

Figure 2:
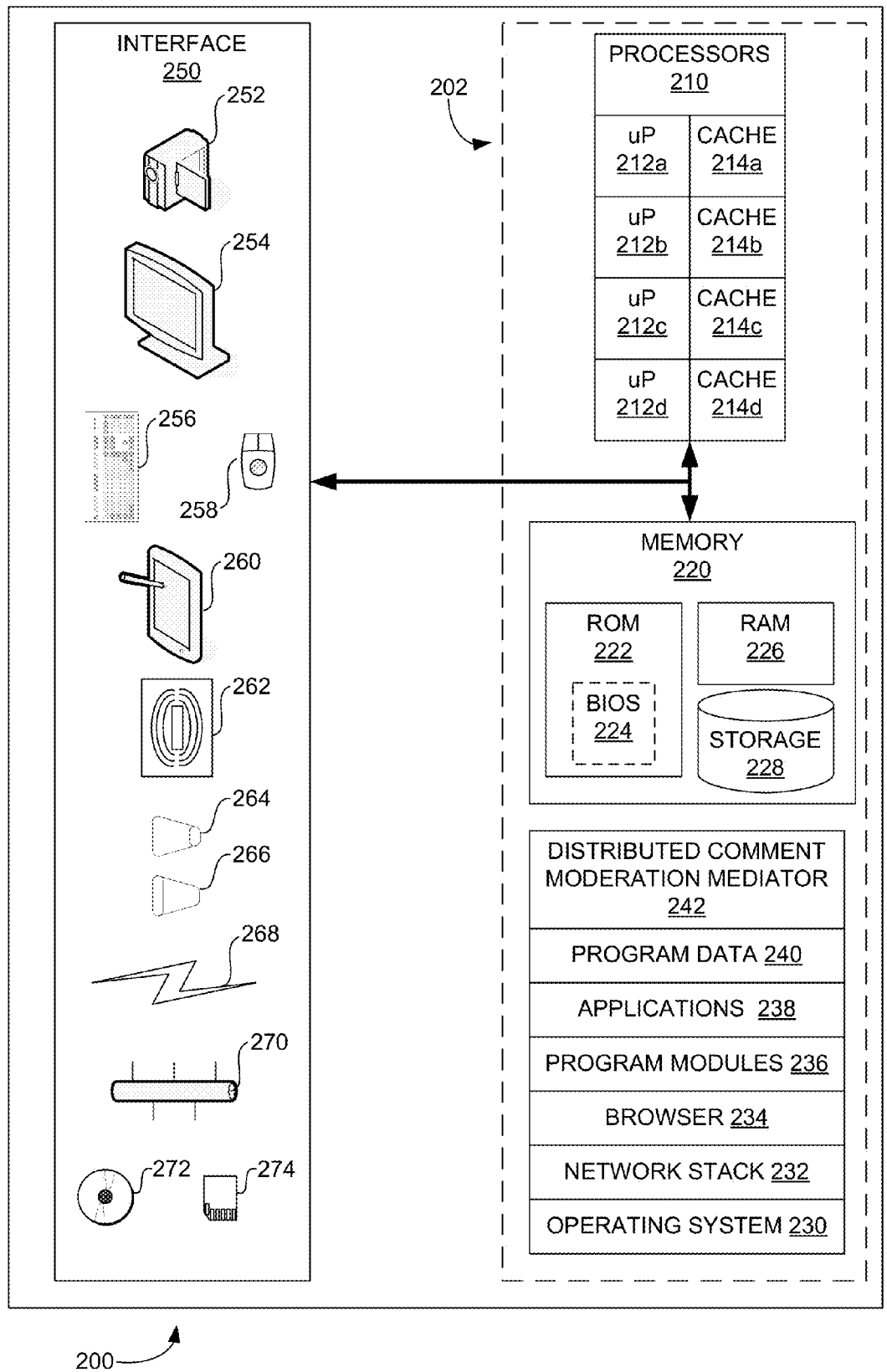
FIG. 2 shows an illustrative computing device in accordance with exemplary embodiments of the disclosure.

FIG. 2 shows an illustrative computing device 200 in accordance with exemplary embodiments of the disclosure. For example, the computing device 200 includes a processing system 202 that is arranged to perform specific tasks in response to applications 238 and program data 240. Processing system 202 is often incorporated into a computing device such as a mobile device, a personal digital assistant, a personal computer, a dedicated web-enabled appliance, a kiosk terminal, automotive electronics, or any other type of networked electronic system or subsystem.

The processing system 202 includes processors 210 and memory 220. Processors 210 may include one or more microprocessor (uP) cores 212a, 212b, 212c, and 212d, each of which is optionally coupled to a respective, local cache 214a, 214b, 214c, and 214d. Memory 220 includes a ROM (read-only memory) 222, RAM (random-access memory) 226, and storage 228 (such as a "hard" disk). ROM 222 optionally includes BIOS (basic input/output system) 224, which typically includes low-level firmware-based drivers for accessing, for example, low-level, hardware-based elements of computing device 200.

Memory 220 includes instructions and data for executing (software) applications 238 (for example), that when executed by processing system 202, perform any suitable function associated with the computing device 200. For example, the processing system 202 executes software (including firmware) and data components such as operating system 230, network stack 232, browser 234, program modules 236, applications 238, program data 240, and comment moderation mediator 242.

Processing system 202 is accessible to users and non-local components using interface 250. Interface 250 provides a user interface that is typically arranged to provide output to and receive input from the user during the execution of the software applications 238. The output to the user is provided by devices such as the display 254 (including indicator lights and image projectors), a speaker 264, vibrations 262, and the like. The input from the user is received using keyboard 256, mouse (and/or trackball) 258, touch/stylus screen 260, audio input 266 and/or video input 252. Other devices can be used such as keypads, switches, proximity detectors, and the like.

The interface 250 is also arranged to transmit communications to and from other computers across a network. Wireless link 268 permits communications using a modulated optical and/or electromagnetic carrier (such as cellular telephone communications). Cabled link 270 permits communications over a wired and/or optical link (such as optical Ethernet and/or Ethernet). The wireless link 268 and cabled link 270 are optionally employed between other network-enabled devices to establish wide-area networks, local-area networks, private networks, and the like. Additionally, tangible media such as disk 272 or "flash" ROM 274 (and the like) are used to store data and instructions and are read from and/or written to by interface 250 in the course of execution of the distributed comment moderation mediator 242, for example. The media is or can be non-transitory media.

In exemplary embodiments of the invention, described below, the distributed comment moderation mediator 242 of service provider 150 is arranged to mediate the moderation of blog comments using a centralized moderation queue. The centralized moderation queue can be used to automatically (including semi-automatically) outsource blog comment moderation to third party resource providers. The distributed comment moderation mediator 242 is optionally arranged to provide an indication of an assessment of the quality of the third party resource providers.

Figure 3:
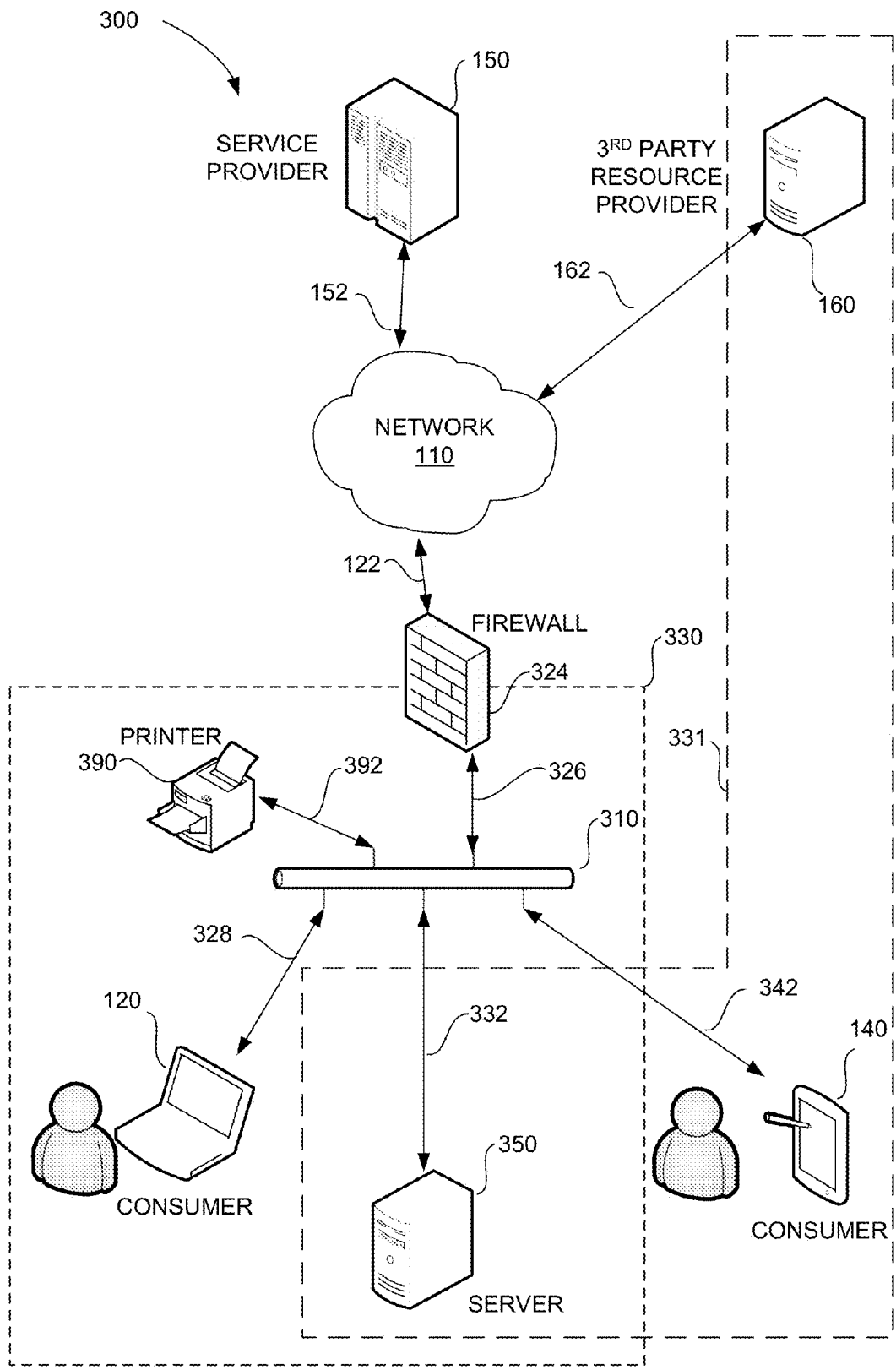
FIG. 3 is a network diagram illustrating in conjunction with FIG. 2 a network that includes distributed comment moderation in accordance with exemplary embodiments of the disclosure.

FIG. 3 is a network diagram illustrating in conjunction with FIG. 2 a network that includes distributed comment moderation in accordance with exemplary embodiments of the disclosure. Network system 300 includes service provider 150 and third party resource provider 160, as discussed above. Service provider 150 is arranged to provide networked content (such as services, data and/or applications, and the like) to consumer 120 via network 110. The content and services are generally provided in the form of communications such as webpages, where the webpages (and other communications) often contain references (e.g., "links") to "external" resources that are to be provided by the third party resource provider 160 (which is also a networked service provider). The content and services can include banking, information storage, search engines, blogging, and the like, and can be networked via the Internet or private (such as a virtual private) network.

Service provider 150 is a server (or a set of servers that are presented as a single server or a "virtual" server for processing requests). The consumers 120 and 140 are typically clients with respect to the server (e.g., service provider 150 and server 350). The consumer 120 and server 350 are networked resources such as, for example, computers that are networked together in a trusted zone 330. A second trusted zone 331 can be arranged having, for example, consumer 140, server 350, and third party resource provider 160 in the trusted zone 331, but excluding consumer 120 from the trusted zone 330. A trusted zone is an exemplary group of network resources (e.g., "machines") that have trusted communications amongst the network resources of a particular trusted zone (such as trusted zone 330) associated with the network-enabled application.

Trusted zones 330 and 331 are protected against attacks from networked resources (such as third party resource provider 160) by firewall 324, which processes communications from the consumers 120 and 140 across the network 110 by providing network address or port address translation, and/or by providing proxy services. Network 310 provides a link 326 for communicating with the firewall 324, a link 328 for communicating with consumer 120, a link 332 for communicating with server 350, a link 342 for communicating with consumer 140, and a link 392 for communicating with printer 390. For example, the consumers 120 and 140 are arranged as local network resources that are networked together in separate trusted zones using a firewall 324 and/or authentication such that the network resources are otherwise inaccessible to an external attack. A trusted zone can include network resources from within a private address space (that includes consumers 120 and 140, for example) as well as network resources that lie outside of the private address space. Thus, the trusted zone can include network resources from a virtual private network where network resources are securely accessed over a public or private network.

The distributed comment moderation mediator 242 is arranged to (for example) mediate (e.g., assign, distribute, and evaluate) the moderation of blog comments. As further described below (e.g., with reference to FIG. 4), a service provider (e.g., 150) that receives blog comments from one or more consumers (e.g., 120, 130, and 140) is arranged to store the posted blog comments using a centralized moderation queue. The comments in the centralized moderation queue are analyzed using a rule-base to group blog comments having a relatively high degree of commonality of adverse elements into a common bin. The adverse elements in common are identified, for example, by the particular rule(s) that identify the presence of a particular kind of adverse element in one or more blog comments. (A blog comment having a high degree of commonality of different selected adverse elements with blog comments of other bins can also be grouped with the other bins).

The binned blog comments (and/or a characterization of the blog comments such as a representative comment) of a particular bin can be sent to one or more selected third party blog moderation services hosted by one or more (for example) third party resource providers 160. An indication of the type of commonality of the adverse elements of the comments in the particular bin (such as the particular rules that indicate the parameter by which the comments have the high degree of commonality) can also be sent to the selected third party resource provider 160. The selected third party blog moderation service is arranged to review a representative comment (often using human input). An action is selected in response to the review and applied to the representative comment. The selected response is applied to the representative comment (as well as the co-binned comments) by either the reviewer, or (after having been signaled by the reviewer) the service provider hosting the distributed comment moderation mediator 242.

Figure 4:
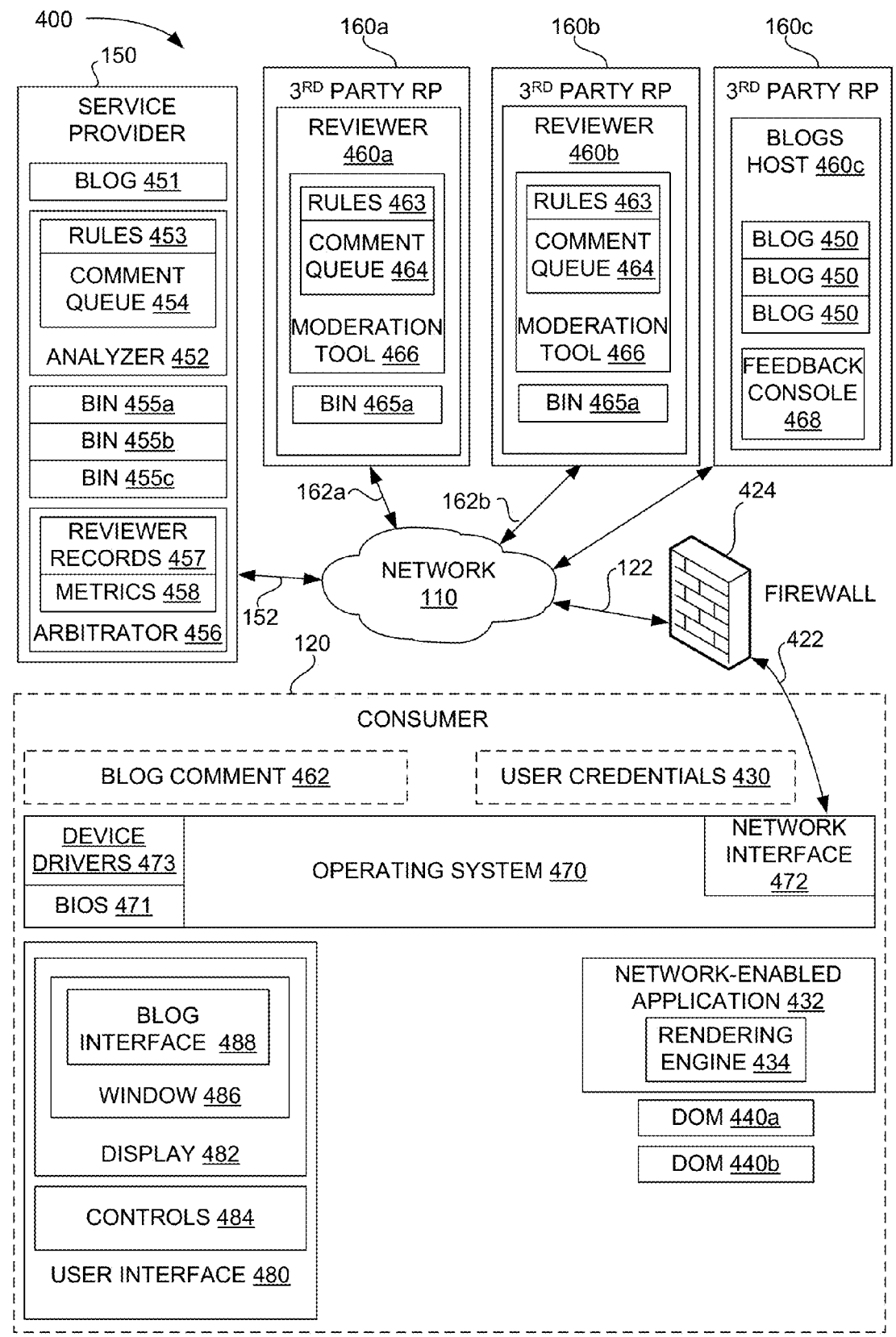
FIG. 4 is a logic diagram illustrating a network resource having a distributed comment moderation mediator in accordance with exemplary embodiments of the disclosure.

FIG. 4 is a logic diagram illustrating a network resource having a distributed blog comment moderation system 400 in accordance with exemplary embodiments of the disclosure. Distributed blog comment moderation system 400 includes, for example: consumer 120, service provider 150, and third party resource providers ($3^{rd}$ Party RPs) 160a, 160b, and 160c. Consumer 120 is arranged to communicate (e.g., securely) with network 110 using communication links 122, firewall 424, and communication link 422. Third party resource providers 160a and 160b are arranged to communicate with network 110 using communication links 162a and 162b respectively.

Consumer 120 typically includes a network-enabled application 432 that is arranged to conduct communications between service provider 150 and consumer 120. For example, network-enabled application 432 includes a browser such as Chrome, Firefox, Internet Explorer, and the like. A user performs an action such as following a bookmark, or clicking on a local link, opening a Word or PDF document, entering a URL (universal resource locator) or IP (Internet protocol) address, entering a blog comment, or selecting a displayed control to select content from blog 451 (or a portion thereof) hosted (e.g., including storing for retrieval by blog participants) by service provider 150, and the like.

Service provider 150 responds by sending a communication to the consumer 120. The communication is received by the network interface 472 of operating system 470 and the communication is passed to the network-enabled application 432 for decoding and rendering, for example, using a window 486 in the display 482.

The communication is often a webpage written in a markup language, although other formats can be used such as style sheets, JavaScript reference, and the like. The webpage often contains elements that address content provided by the service provider 150 as well as content provided by one or more third party resource providers 160 (such as third party resource providers 160a or 160b). The references in the received communication are, for example, instantiated using a DOM 440 (document object model such as DOM 440a or 440b) as the network-enabled application 432 parses the received communication in accordance with the format used to encode the information encoded in the received communication. The DOM 440 can be arranged as a parent DOM that is associated with one or more children DOMs, wherein each of the DOMs can be associated with a network resource that is determined by the received communication.

As the network-enabled application 432 parses the received communication from the service provider 150, the network-enabled application 432 constructs a DOM 440 (such as DOMs 440a and 440b) that delineates the structure and the function of the encoded information. The DOM 440 is arranged to render both content of requested third party resources (such as third party resources 460b) and local references on the same website, for example. The rendered content can be used to manage a window 486 of a webpage (conveyed by the encoded information) for display in the display 482 (typically via BIOS 471 of the operating system 470). The display 482 is used to provide visual indications to a user and to prompt (e.g., query) the user for input. The user input is captured using controls 484 (such as by a keyboard and/or a mouse) of the user interface 480.

Window 486 is a (e.g., computer program) application window that is arranged to display program output and to help capture user input. Window 486 is, for example, a window of a network-enabled application 432 and is associated with a blog interface 488 that is arranged to be exercised by a user using controls 484. The blog interface 488 is included in the received communication by the service provider 150 as, for example, a blog interface 488 that is rendered by rendering engine 434. The blog interface 488 is typically rendered in accordance with a DOM (such as DOM 440*a*). Blog interface 488 is used, for example, by a user to enter a blog comment 462 for (eventual) posting to a blog 450 or 451.

In exemplary embodiments of the invention, a consumer (e.g., consumer 120) is arranged to post comments from a user (of consumer 120) to a blog (such as one of the blogs 450 hosted by blogs host 460*c* or blog 451 of service provider 150). Because the consumer comment might include adverse elements (such as a link to an adverse site, executable code, spam, and the like), either or both of the blog host and a blog reviewer take(s) protective actions to reduce (and/or eliminate) the potential adverse effects of an adverse posting. For example, the service provider 150 is arranged to moderate received (and/or posted) blog comments from a blog hosted on the service provider 150 or a third party resource provider (e.g., 160*c*). The service provider 150 is arranged to store the posted blog comments using a (for example, centralized) comment queue 454.

The service provider 150 stores the posted blog comments in the comment queue 454 by receiving blog comments from selected blogs. Accordingly, cross-posted blog comments (for example) can be identified because the cross-posted (e.g., content posted to multiple blogs) to blog comments have been pooled together in the comment queue 454. After the pooled comments have been analyzed and sorted (associated by type, for example), the sorted comments can be "surfaced" (e.g., brought to the attention of a blog moderator service and/or human reviewer) for cost-effective content moderation. The disclosed content moderation provides tools to increase the efficiency and accuracy of manual, automatic, semi-automatic, or combinations thereof for content moderation.

The comments in the comment queue 454 are analyzed by analyzer 452 using a rule-base such as rules 453. (The various functions of the analyzer 452 by the rule-base.) Analyzer 452 uses the rules 453 to determine which blog comments are identified (e.g., labeled as being "bad" or suspect) by specific rules. The identified blog comments are grouped in (or into) bins by the analyzer 452 in accordance with the type(s) of rules used. Thus, blog comments having a high degree of commonality are grouped into a common bin, (such as one of bins 455*a*, 455*b*, or 455*c*). The analysis produced using rules 453 includes selecting a group of comments having a high degree of commonality and grouping the selected comments into a common bin. Because individual comments are placed into specific bins by the application of by one or more rules, the type of commonality for each bin is typically different for each bin. Thus, each bin can be uniquely associated (with a rule and/or a set of rules) that has been used to identify the high degree of commonality amongst the comments of a bin.

Each rule (including one or more rules, sets of rules, and/or subsets of rules) can be individually selected and/or customized (by a blog moderator and/or a service provider administrator, for example) using a respective interface. Thus, the rule(s) can be optionally selected (or unselected) and applied to a blog, for example, depending on the type of blog to which the rule(s) are to be applied. For example, a blog devoted to the development of pharmaceuticals might not want to block comments that mention a drug name (that happens to be common to spam messages). Likewise, the usage of an IP address in a URL included (or otherwise associated with) a comment might not necessarily inappropriate for posting to a technically oriented blog (because the blog might discuss such a blog comment construct). Further, the customization of the rules by a third party reviewer 160 allows competition between reviewers, which increases the overall quality of the blog moderation of the reviewers (as motivated by the potential reward of additional, future business, for example).

A blog comment can have varying characteristics (such as described below) that are identified by the rules 453. Thus, a particular blog comment can be associated with one or more bins, where the particular blog comment can (e.g., nevertheless) have a high degree of commonality with the blog comments of other bins. However, the degree of commonality of a particular bin is typically limited by at least one rule in rules 453 that is different from each selected set of rules 453 respectively used to associate blog comments of the other bins.

A blog comment can have a risk assessment rating assigned to the blog comment in response to an analysis that is performed by analyzer 452 applying a selected set of rules from rules 453. For example, a particular blog comment can be rated using one or more selected rules (and/or selected sets of rules). When more than one rule or rule set is used to rate a particular blog comment, the risk assessment rating for the particular blog comment can be determined by combining each rating determined for the applied rules to determine an aggregate (e.g., "combined") risk assessment rating.

Each individual risk assessment rating can be normalized (e.g., weighted as a percentage of a whole) in accordance with the importance of the rule in determining the aggregate risk assessment rating. For example, the risk assessment rating that is determined by rule that determines that a particular blog posting was posted from an address associated with known spam generation can be weighed (e.g., much) more heavily than a the risk assessment rating that is determined by rule that determines that a particular blog posting contains a word that is often used in spammed blog comments. In this case, the first risk assessment rating can be multiplied by a factor of 0.75 and the second risk assessment rating can be multiplied by a 0.25 so that the aggregate risk assessment rating is normalized over unity (for example).

Rules 453 includes a rule that is arranged to, for example, combine all good and bad comments from all customers by the IP addresses from with the blog comments originated. For example, the rule is arranged to sort all of the comments in the comment queue 454 (which typically contains blog comments from a plurality of blogs) by IP addresses, which enables the comments posted from a single IP address to be analyzed as a group. The analysis of the posts from a suspect IP address can be used to characterize (e.g., as a percentage and volume) of identified "bad" posts originating from the suspect IP address. The characterization can be stored and updated to maintain a current assessment of the suspect IP address. As described above, a post can be identified as being "bad" for a number of different reasons. The reason a post is "bad" (e.g., posting age-inappropriate comments) can also be stored and updated so that an IP address can be assessed by the types of "bad" posts that are posted therefrom.

Rules 453 includes another rule that is arranged to, for example, search for blog posts originated from IP addresses that have been assessed (e.g., in the past) as posting a high percentage of "bad" posts to determine an instant risk assessment rating as a percentage. For example, if an IP address is assessed as always posting spam, a risk assessment rating of 100 percent is determined (this risk assessment rating can be combined with other risk assessment ratings to produce an aggregate risk assessment rating as discussed above). Likewise, if an IP address is identified as being generated by a "super proxy" (e.g., a proxy server that is used to hide the addresses of typically multiple original senders of postings) that posts spam five percent of the time, an initial risk assessment rating such as 5 percent is determined. The initial risk assessment rating (which can be used in combination with other risk assessment ratings) can be used (e.g.) to determine how to moderate a selected comment (and comments binned with the selected comment) or to determine which rules to apply. For example, a blog comment coming from an IP address that has a "bad reputation" can be scrutinized more closely (which typically consumes more processing power and latency) than would blog comments originating from IP addresses having unknown or safe reputations.

Likewise, when the risk assessment rating exceeds a threshold (that is associated with a secondary rule set or one or more rules), the secondary rule set (e.g., selected from a rule-base such as rules 453) can be applied to the blog comments. This allows for rules to be applied which might otherwise substantially slow down processing (e.g., such as producing a time difference that is noticeable by a human observer when respectively running risk assessment analyses with and without the secondary rule set).

Rules 453 includes a rule that is arranged to, for example, determine the language set (e.g., the language and character sets) of posted blog comments. For example, the rule compares the language set of blog comments against the known approved language sets (e.g., approved for the blog 450 in which a particular blog comment is posted). If a certain percentage of characters or words is not supported by the associated blog, the comment can be "flagged" (e.g., identified) for violating the non-native origin rule. Likewise the non-native origin rule can assess whether a language denoted by an "Accept-Language" HTTP (hypertext transfer protocol) header matches the language of the comment (and flagged and/or provided a commensurate risk assessment rating).

Rules 453 includes a rule that is arranged to, for example, identify blog posts having a single IP address from which more than one blog comment has been rapidly posted. For example, the rule identifies suspect blog comment posts by assessing the volume of posts from a single IP address. If the volume of blog posts exceeds a volume (e.g.,) that exceeds a the capability of a valid blog user manually entering posts to one or more blogs, the comment is identified as likely being invalid on account of likely being computer-generated (and/or pasted multiple-times).

Rules 453 includes a rule that is arranged to, for example, identify URLs that are present in the blog comments and that have been found in email messages (and/or other blog spam sources) known to contain spam. For example, a spam email filter can provide the rules 453 with the known "spam" URLs such that blog comments containing the same, similar, and/or sharing top-level domain URLs can be readily identified.

Rules 453 includes a rule that is arranged to, for example, determine whether blog comments contain an "empty body" or a body that substantially only contains a link or the commenter's URL. For example, empty posts can be made to a blog to consume bandwidth and/or posting space (such as used to list comment headers, posting times, and the like) so that valid blog posts are "crowded out." Thus, a risk assessment rating is assigned based on the degree to which a post is empty or only posts a link.

Rules 453 includes a rule that is arranged to, for example, determine blog comments having a known bad regular expression ("regex"). For example, where the blog comment includes a regular expression or a pattern such as ">.</a> or ">,</a>, the blog post can be assigned a high risk assessment rating based on the risk posed by the particular regular expression or pattern posted in the blog comment.

Rules 453 includes a rule that is arranged to, for example, determine blog comment postings having a number of links in a post that exceeds a threshold number of links. For example, the threshold number of links can be selected (e.g., three) based on the maximum number of links expected in a valid blog post. The risk assessment rating for a blog comment can be determined based on the number of links in the blog comment.

Rules 453 includes a rule that is arranged to, for example, determine blog comment postings having referrers that do not match the host or any other versions of the host. For example, when the website subdomain is "www.example.com" and the "Referer" (as thusly spelled in the HTTP standard) header is either blank or contains a different subdomain (e.g., "www.whatever.com"), the likelihood that a blog comment posting came from a search engine with a dangerous referrer that implicates the post as spam. However, not all such instances are indeed spam as there are sometimes "valid" reasons people do not send referring URLs (e.g., various anti-virus products strip the referring URLs).

Rules 453 includes a rule that is arranged to, for example, determine blog comment postings having referrers that contain key words that, for example, indicate that the blog poster was referred by a search engine. For example, a potential "spammer" can search for potential blogs to spam by searching for terms that are commonly found in blog pages. Such terms include words that identify blog themes, names of tools and widgets used to publish a blog, and other such content likely to be indicative of a blog page. When the potential spammer receives an HTML list (for example) of "hits" on a search result page from a search engine, the potential spammer will often click on a link that contains a blog that the potential spammer would like to spam. The server hosting the blog (such as the service provider 150) can log the "Referer" information in the HTTP header provided by the request by the potential spammer (the server can also associate the logged "Referer" information with the address or other identifier of the potential spammer). When the potential spammer posts to the blog, the logged information is associated with the blog comment. When the blog comment is evaluated, the associated logged information is examined to determine a likelihood that the blog posting was made in response to (for example) clicking on a search result provided by a search engine. A risk assessment rating for a blog comment can be assigned in accordance with the determined likelihood.

Rules 453 includes a rule that is arranged to, for example, determine blog comments that originate from a trusted zone (such as a whitelist of IP addresses). For example, a business entity can rely upon a belief that all posts made from certain IP addresses are valid. For example, customers of a business and/or known-"good" commenters can have their IP addresses added to a whitelist in the course of business or (previous) blog moderation. Thus, a whitelist can be used to downgrade (or eliminate) any risk assessments made for posted blog comments originating from a whitelist stored in the rules 453.

Rules 453 include a rule that is arranged to, for example, determine blog posts having against bad or questionable HTTP headers. Bad or questionable HTTP headers can be encountered when differing revision levels are encountered in the HTTP of a blog comment. For example, differing revision levels can be encountered when the HTTP/1.1 revision level is used instead of the HTTP/1.0 revision level (which is outdated). The differing revision levels are rarely used by modern browsers in combination. Further, the HTTP/1.0 revision level is commonly used by web robots ("bots"). A risk assessment rating made using this rule can further refine the risk assessment rating in association with other rules. For example, when a "User-Agent" that contains the keyword "libwww" (which is an indicator of a mechanized commenter), it is highly likely that the blog comment is indeed spam.

Rules 453 includes a rule that is arranged to, for example, determine blog comments having against words that are contained in individual customer-approved bad word lists. For example, the bad word lists can be selected for risk assessment based on region/language, words and phrases known to be trapped by government-mandated screening firewalls, "hate-speech" words, customizable bad-word lists, and the like. Each word can be assigned an individual risk assessment rating. Likewise, the context in which the words are encountered (such as a region or language) can be used to further upgrade or downgrade the risk assessment for the word. The risk assessment rating for a blog comment can be determined based on the number of words (and associated contexts) in the blog comment.

Rules 453 includes a rule that is arranged to, for example, determine blog comments that occur after a time span after an associated blog event. For example, the age of the post to which a blog comment is posted can be compared against the date of the blog comment being moderated. Likewise, a blog comment post that is made just after having retrieved a blog webpage is likely to be posted by an automated process (e.g., where not enough time has elapsed from when the poster first downloads the page for a human to have typed out the blog comment to when the blog comment is posted). If the time span exceeds (or falls below) a selected threshold, the blog comment being moderated can be assigned a risk assessment rating proportionate to the time span.

Rules 453 includes a rule that is arranged to, for example, determine blog comments having identical (or similar) text to previous posts. For example, repeated blog postings (whether inadvertent or intentional duplicates) can quickly distract from a positive user experience in a blog. Repeated blog comments (whether on the same blog 450 or not) can be given a high risk assessment rating such that the repeated comments can be surfaced to a blog moderator or automatically deleted.

Rules 453 includes a rule that is arranged to, for example, determine blog comments having query strings in the commenter's URL structure. For example, a blog comment may include a query string in the commenter's URL structure as in the example "www.example.com/page.aspx?diet %20pills." Blog comments having a query string in the commenter's URL structure can be given a selected risk assessment rating in accordance with the rate of occurrence of the embedded query stings in the commenter's URL structure of known-spam.

Rules 453 includes a rule that is arranged to, for example, determine blog posts having particular top-level domains (e.g., .info). For example, blog comments posted from certain top-level domains (TLDs) can be assessed a risk assessment rating in accordance with favored/disfavored TLDs (e.g., "info" versus ".com" as well as later-assigned TLDs). Likewise, risk assessment ratings can be determined by comparing the TLD of the blog posting with a localized language and/or region (e.g., English speakers receiving a blog comment originating from a ".ru" TLD can be considered to be suspicious).

Rules 453 includes a rule that is arranged to, for example, determine blog comments having IP addresses in place of URLs for addresses from which the blog comment was posted. For example, a blog comment having an IP address (rather than a URL) can be considered to be suspect (e.g., suspicious) due to the lack of the accountability provided by the DNS registry system. Thus, a blog comment having an explicit IP address can be assigned a risk assessment that is in accordance with a percentage believed to be representative of the threat posed by blog comments having such addresses.

Rules 453 includes a rule that is arranged to, for example, allow blog owners/hosts to allow or deny comments based on selected geographical regions. For example, blog hosts and moderators can include or exclude blog comments in accordance with a determination that a blog comment falls within (or outside of) pools of IP addresses and/or selected IP address ranges. Thus, the occurrence of spam from certain geographical regions that are different from countries/regions of an intended blog audience can be reduced. Accordingly, a risk assessment can be assigned that is in accordance with a percentage believed to be representative of the threat posed by blog comments being posted from selected countries and/or regions.

Rules 453 includes a rule that is arranged to, for example, determine blog comments having keyword phrases (where each phrase has one or more words) that are known to be high in spam. For example, phrases including words such as Viagra, phentermine, and the like are assigned appropriate risk assessment ratings. The keyword phrases are grouped by category, so that (for example) insurance keywords would not be marked against a user posting to an insurance blog. Thus the risk assessment rating is determined in response to the category of the keyword phrase and the category of the blog to which the blog comment was posted.

The analyzer 452 is further arranged to "data mine" the comment queue 454 for information and metrics relating to various blog posters and blog comment such anchor tags, other pages visited, time between pages, and the like. The information and metrics can be used to automatically adjust risk assessment ratings based on less-comprehensive-based rules for example.

The determined risk assessment rating(s) (in aggregate combination or individually for each rule) are used to select comments for a particular bin. A threshold can be adjusted to determine an optimum threshold. The optimum threshold can be determined by adjusting the threshold upwards and downwards and determining the rate at which blogged comments are being added (or subtracted from) the bin. Local maxima and minima can be observed over the range for each risk assessment rating with the number of false positives (as determined by a human reviewer) evaluated at selected ranges of the adjusted threshold values. The determined optimum threshold can be automatically applied to subsequent binning operations.

The binned blog comments (and/or a characterization of the blog comments such as a representative comment) of a particular bin (e.g., bin 455a or bin 465a) can be sent to one or more selected third party blog moderation services (e.g., reviewers 460a and/or 460b) hosted by one or more (for example) third party resource providers (e.g., 160a and 160b). An indication of the type of commonality of the comments in the particular bin (such as the particular rules that indicate the parameter by which the comments have the high degree of commonality) and the respective risk assessment ratings can also be sent to the selected third party resource provider 160. The binned blog comments sent from the service provider 150 are stored, for example, in a bin 456a.

The service provider 150 can alternately (or in conjunction with the above-described analysis) send to the selected reviewer 460 (e.g., 460*a* and/or 460*b*) selected comments from the comment queue 464 and the rules 453. The selected reviewer 460 is arranged to store the received selected comments in the comment queue 464 and the received rules in rules 463. The selected reviewer 460 is arranged apply the rules 463 (which may include rules from rules 453 that have been copied, selected, customized, modified, and/or augmented by the selected reviewer 460) to the received comment in the comment queue 464 to identify threads of commonality in the received comments and to determine, evaluate, and/or modify risk assessment ratings.

The selected reviewer 460 is arranged to, for example, "surface" (e.g., bring to the attention of) a moderation tool 466 so that the binned comments can be moderated. (Rules 463 are implemented, for example, a rule-base and thus can execute various functions of the moderation tool 466.) The moderation tool 466 can have one or more rules 463 in common with the rules 453 of analyzer 452. The moderation tool 466 can also have a number of rules 463 that is more or less than the number of rules 453 of analyzer 452. The moderation tool 464 of reviewer 460*a* is adapted to perform a risk assessment analysis singly or in combination with one or more other computing resources (such as service provider 150 and/or reviewer 460*b*). When used in combination with other computing resources, analyzer 452 can (for example) pass the results of a first analysis of blog comments (and the associated binned blog comments 455*a*) to the moderation tool of 466 of reviewer 460*a* so that further (such as more refined and/or customized) analysis can be performed on the passed blog comments. Reviewer 460*a* can also pass blog comments (from comment queue 464 and/or bin 465*a*) to reviewer 460*b* (e.g., for further review and/or for load balancing issues).

The binned comments can be moderated by using the moderation tool 466 to review a representative comment (often using human input). An action is selected in response to the review and applied to the representative comment. The selected response is applied to the representative comment (as well as the co-binned comments) by either the reviewer. Alternatively (or in conjunction with), the service provider 150 can also apply the selected response to the representative comment (as well as the co-binned comments) in response to a signal received from the selected reviewer 460.

The moderation tool 466, for example, can reduce the chore of moderating each comment individually because the selected action can be applied (e.g., used to moderate by editing or deleting) to similar blog comments (e.g., comments associated in a same bin). The moderation tool 466, for example, "scales" (e.g., leverages and/or extends) the effort taken by a moderator for one comment, and can apply the same action automatically (including semi-automatically) to multiple comments in the same blog and/or similar comments posted across multiple blogs. Accordingly, duplication of effort can be avoided, and efficiencies of blog comment moderation services can be enhanced.

The service provider 150 is arranged to track (e.g., via metrics 458) and record (e.g., via reviewer records 457) the results of the moderation for each selected reviewer 460*b*. For example, the results of the moderation can be propagated out to the blogs 450 and/or blog 451. The metrics can be culled from a measured time span (such as weekly or monthly) to determine (and/or display) relevant information such as the volume of spam, IP addresses and URLs associated therewith, numbers of blog comments received, numbers of blog comments moderated by a selected reviewer for a particular blog, and the like. The metrics can be used to determine amounts for billing and cost accounting.

The quality of blog comment services provided by a particular reviewer can be determined by providing a feedback console 468 so that, for example, blog owners and/or moderators can report false positives (e.g., valid blog posts that have been identified as "bad"), false negatives (e.g., blog posts not properly moderated), good or poor moderation services provided by the reviewer 460, and provide comments and improvements to the service. (When the service provider 150 maintains its own blog, the service provider 150 can also use a feedback console to capture feedback from itself.) The service provider 150 can use the feedback loop to find poor performing rules and/or manual reviewers. The service provider 150 can also test (e.g., by providing a "borderline" spam and evaluating the results of) one or more reviewers (such as 460*a* or 460*b*) to help ascertain the degree of correctness and agreement of the results of the reviewers. The test can be tailored to evaluate the response of a particular reviewer to a specific type of spam by submitting a test spam comment having spam of the specific type. Likewise the service provider 150 can use the feedback loop to identify and reward high performing manual reviewers (as well as warn poor performers).

The arbitrator 456 can use the feedback information (which can also be stored in the reviewer records 457 and metrics 458) to determine where to send blog comments have issues of a specific type (in accordance with a specific rule) to a specific selected reviewer 460 (who, according to the metrics 458 and reviewer records 457) has historically performed well in moderation of comments of the specific type. In a similar fashion, the arbitrator 456 can use the feedback information to determine where not to send blog comments have issues of a specific type to a specific selected reviewer 460 has historically performed poorly in moderation of comments of the specific type. The arbitrator can also make the determination of where to send blog comments for review based on the workload volume currently being handled by each reviewer 460.

For example, the arbitrator 456 can use the feedback information in a bidding process. The arbitrator 456 can solicit bids for moderating a blog (and/or a selected block of blog comments). The arbitrator 456 receives bid amounts from interested reviewers 460 and uses the feedback information to (automatically) set individual thresholds for accepting a bid from a particular reviewer that is based on the past performance of the particular reviewer. Thus, for example, the arbitrator can pay more for a quantity of high-quality services, and less for the same quantity of lower-quality services.

Accordingly, as disclosed herein, a distributed blog moderation system 400 provides a (e.g., centralized) moderation queue that is used to automatically (including semi-automatically) outsource blog comment moderation to third party resource providers. The distributed blog moderation system includes a moderation tool 466 for blog moderation that applies a reviewer's moderation action to a selected, representative posted blog comment. The moderation tool 466 applies the reviewer's moderation action to other blog comments that are similar to the selected, representative posted blog comment, which allows, for example, large numbers of blog comments to be moderated by a human reviewer using the effort taken to moderate one blog comment.

The distributed comment moderation mediator 242 is optionally arranged to provide an indication of an assessment of the quality of the third party resource providers. Thus the attempts by administrators to block out adverse posters such as "web-bots" (or "bots") can be alleviated and the use challenge-response tests reduced. Because the moderation efforts are leveraged, the difficulty of moderating increasingly multiple blogs and multiple posts of a blog comments is also alleviated.

Figure 5:
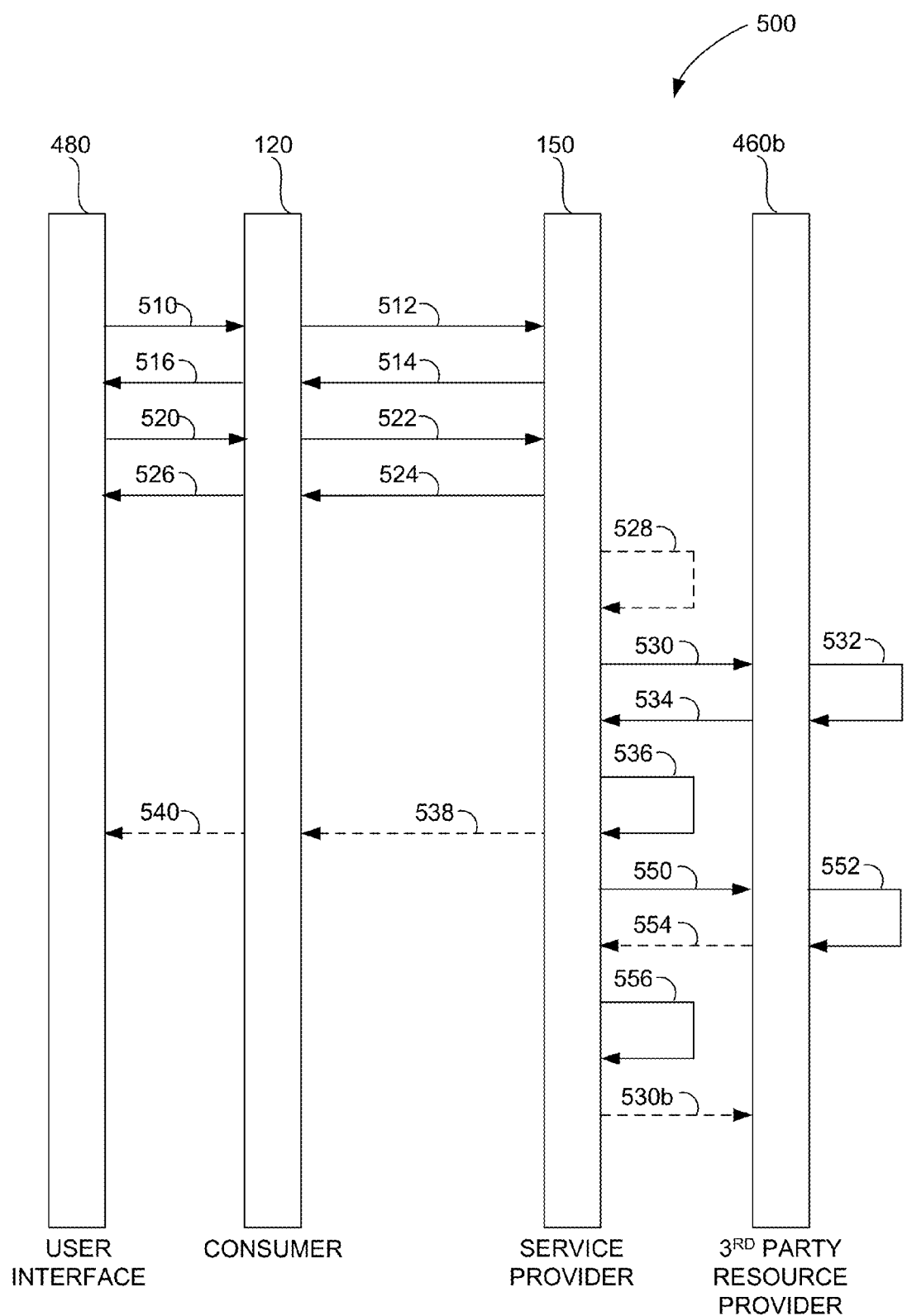
FIG. 5 is a signaling diagram illustrating in conjunction with FIG. 4 operation of distributed comment moderation architecture in accordance with exemplary embodiments of the disclosure.

FIG. 5 is a signaling diagram illustrating in conjunction with FIG. 4 operation of distributed comment moderation architecture in accordance with exemplary embodiments of the disclosure. Signaling diagram 500 illustrates communications transmitted and received between and amongst the user interface 480, for example, consumer 120, service provider 150, and third party resource provider 460*b*. A user at user interface 480 sends a command 510 via an external network to consumer 120 to (eventually) generate a request 512 for content (or other services) from service provider 150. In response, service provider 150 transmits via the external network a communication 514 that includes an object (such as blog interface 488) for requesting and receiving blog comments from the user at user interface 480. The blog comments can include text, links, graphics, and the like.

When the communication 514 is received and parsed (for example), consumer 120 constructs (for example) a DOM 440. The DOM 440 is rendered and the results are sent via communication 516 to user interface 480 for display in window 486. A user at user interface 480 can supply the blog comments for posting on a blog hosted (for example) by service provider 150 via command 520. The consumer 120 then forwards the blog comment via command 520 to the service provider 150 using communication 522.

Upon receiving the blog comment from the consumer 120, the service provider 150 optionally publishes (e.g., make available for downloading to blog participants) the blog comment on the blog. (In other exemplary embodiments, the blog comment can be published after blog moderation as described below.) The service provider 150 responds with communication 524, which indicates (for example) that the comment is posted to the blog hosted by service provider 150. Upon receiving the communication 524 (that includes an indication of the blog comment), the consumer 120 parses the communication 524 and updates the DOM 440 in response. In command 526, the user interface 480 is instructed to display the received blog comment.

In operation 528, the service provider optionally performs an analysis (such as a risk assessment), which is used to rate and/or bin comments. The results of the optional analysis can be used for comparison with (future) results of third party blog moderation services in order to rate the quality of third party reviewers. Further, the analysis can be used to help select a third party reviewer to send blog comments for review.

In communication 530, the service provider 150 transmits an indication of blog comments to a third party reviewer for blog moderation. The third party reviewer is (for example) hosted by the third party resource 460*b*. The indication of blog comments can contain (for example), all comments of a blog, selected comments of a blog, representative comments of a blog, a link to the comments on the blog, (updated) rules to be used to apply to the selected blog comments, and the like. Likewise, the indication of blog comments can provide indications of blog comments from multiple blogs.

In response to the communication 530, the third party resource 460*b* performs an analysis 532 that provides risk assessment ratings for blog postings. The third party resource 460*b* uses the risk assessment rating to moderate the blog comments for which the indication of blog comments was received in communication 530. The third party resource 460*b* generates a communication 534 that returns an indication of the moderated blog comments. The indication of the moderated blog comments includes at least one of the moderated blog comments, links to the moderated blog comments, one or more of the risk assessment ratings, an indication of which blog comments are associated with particular risk assessment ratings, rules to respectively apply to specific comments, the particular blog and bin from which the comments were received for moderation, billing information (such as time received, time delivered, processing time, bandwidth consumption), and the like.

In operation 536, the service provider 150 modifies the blog comments in response to the received indication of the moderated blog comments. For example, the comments in the comment queue are deleted and the blog comments in the blog are modified using the received indication of the moderated blog comments. When the comments in the comment queue are from multiple blogs, the comments in the multiple blogs are updated.

The changes to the blog that result from distributed blog moderation can be propagated to people currently browsing the blog via communication 538. For example, communication 538 includes changes to the blog (or portion of the blog) that is being displayed to a user of consumer 120. The communication 538 is received by consumer 120, which in response generates command 540 to the user interface 480 for updating the visual display.

As discussed above, the service provider 150 evaluates the quality of services provided by reviewers of third party resource providers (e.g., 460*b*). The quality of the services provided by the reviewers is used to determine a threshold at which the bid from each reviewer (from which a bid was received) would be received. The bid prices received from the reviewers are respectively and individually adjusted by a value that indicates the quality of work from a specific reviewer. The adjusted bid prices are compared, the bid awarded, and the blog comments (that are the subject of the bidding processes) are sent (if not already sent as part of the bidding process, for example) to the winning bidder.

For example, in communication 550, the service provider 550 publishes (to one or more reviewers) a solicitation for blog moderation, where the solicitation provides an indication of the blog comments to be moderated. (Alternatively and/or conjunctively, the indication can be one or more metrics such as the number of blog comments, the number of characters, the number of "hits" for the blog, and the like.) In operation 552, each participating reviewer (in one or more third party service providers, such as third party service provider 460*b*) evaluates the bid proposal (e.g., using considerations such as available workload, history of successful/unsuccessful bid amounts, bid maximums, and the like). If a reviewer decides to submit a bid, the third party reviewer 460*b* sends the bid in communication 554 the service provider 150. In operation 556, the service provider evaluates each received bid, and for example, awards the bid by sending in communication 530*b* (which is similar to communication 530) an indication of blog comments to the selected third party reviewer for blog moderation. Accordingly, a first device is arranged to determine posted blog comments having a commonality of identified adverse elements, and a third device is arranged to host a blog comment reviewing service that is different from the blog comment reviewing service that is associated with a second device, wherein the first, second, and third devices are addressed using top-level domains that are mutually exclusive.

In various exemplary embodiments, the protective actions taken by consumer 120 (in response to the detection of a malicious element or link in the blog posting of communication 522, for example) can take a variety of forms. For example, a portion of the blog comment can be removed from the blog posting. In yet another example a portion of the blog comment can be modified to render the portion of the blog comment relatively harmless before sending the communication to the service provider 150. In another similar example, the reviewer can provide a warning that the blog comment contains potentially hazardous payload (such as a malicious element or link to malicious website) so the service provider can selectively take appropriate action. The appropriate action taken by the reviewer 460 can also include providing a notification of a potential malicious element in a blog comment (in response to a warning signal, for example) to a user, an administrator, a third-party security services provider, and the like associated with the service provider 150 (which is supervising the moderation of the blog to which the potentially malicious blog comment was posted). The service provider 150 can transmit a warning and/or notification a user, an administrator, a third-party security services provider, and the like (associated with the blog to which the potentially malicious blog comment was posted, for example) that specifies a protective response (to ameliorate the threat posed by the potentially malicious blog comment, for example).

Figure 6:
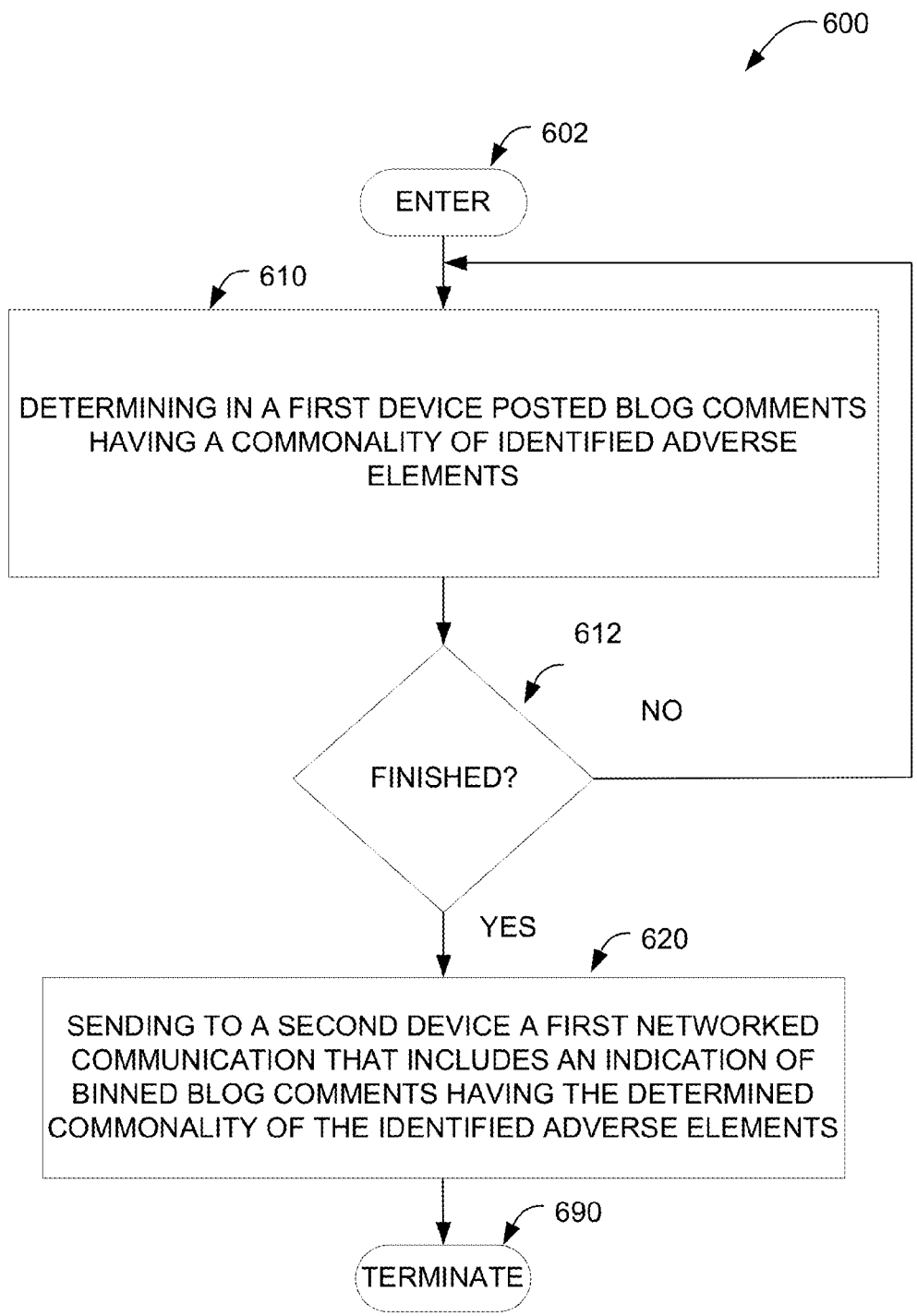
FIG. 6 is a flow diagram illustrating distributed comment moderation architecture in accordance with exemplary embodiments of the disclosure.

FIG. 6 is a flow diagram illustrating distributed comment moderation architecture in accordance with exemplary embodiments of the disclosure. The program flow illustrated herein is exemplary, and thus various operations (and various portions of the operations) within the program flow can be performed concurrently and/or in an order that is not necessarily the same as the program flow illustrated herein (including, for example, using logical substitutions and reordering made in accordance with DeMorgan's theorems and Boolean algebra). Program flow 600 begins at node 602 and proceeds to operation 610.

In operation 610, determining in a first device (such as a service provider) binned posted blog comments having a commonality of identified adverse elements. For example, the determination can be used to identify different posted blog comments that have the same or similar objectionable material in the posting. Program flow proceeds to operation 612.

In operation 612, it is evaluated whether the determinations are finished. If the determination is made that the commonality of identified adverse elements determinations are finished, program flow proceeds to operation 620. If the determination is not made that the commonality of identified adverse elements determinations are finished, program flow proceeds to operation 610, where another determination of one or more the commonality of identified adverse elements is conducted (for example, using another rule in a set of rules that is associated with a type of the commonality of the identified adverse elements).

In operation 620 sending to a second device (such as a reviewer that hosts a blog moderation service) a first networked communication that includes an indication of binned blog comments having the determined commonality of the identified adverse elements. For example, the first networked communication can include a link to the binned blog comments, the binned blog comments, a characterization of the binned blog comments, a representative sample of the binned blog comments, combinations thereof, and the like.

The various exemplary embodiments described above are provided by way of illustration only and should not be construed to limit the claims attached hereto. Those skilled in the art will readily recognize various modifications and changes that could be made without following the example exemplary embodiments and applications illustrated and described herein, and without departing from the true spirit and scope of the following claims.

The invention claimed is:

1. A method, comprising:
   determining by a processor in a first device posted blog comments having a commonality of identified adverse elements; and
   sending to a second device a first networked communication that includes an indication of binned blog comments having the determined commonality of the identified adverse elements, wherein the second device is selected by the first device and a type of commonality of identified adverse elements of the indicated binned blog comments is sent to the second device;
   transmitting a second networked communication that includes an indication of a protective action selected in response to an analysis of the at least one of the identified adverse elements, wherein the second networked communication includes moderated blog comments generated in response to the selected protective action and the indicated binned blog comments;
   generating a risk assessment rating for the indicated blog comments that is determined in response to one or more rules of a rule-base, wherein the one or more rules are selected in response to the sent type of commonality of the identified adverse elements of the identified binned blog comments; and
   examining header information associated with a blog posting used to post at least one of the indicated binned blog comments, wherein the header information is examined for Hypertext Transfer Protocol Referer information that indicates that the referring page used to generate the blog posting is a search engine result page.

2. The method of claim 1, wherein the moderated blog comments are moderated by selecting an action and automatically applying the selected action to each of the identified binned blog comments.

3. The method of claim 2, wherein the identified binned blog comments are binned by determining a type of commonality of the identified adverse elements.

4. The method of claim 3, further comprising receiving in the first device an indication of the results of the moderation of the binned blog comments by the second device.

5. The method of claim 4, further comprising sending to a third device a third networked communication that includes an indication of the binned blog comments, wherein the third device is selected by the first device and the type of commonality of identified adverse elements of the indicated binned blog comments is sent to the third device.

6. The method of claim 5, further comprising receiving in the first device an indication of the results of the moderation of the binned blog comments by the third device.

7. The method of claim 6, further comprising comparing the received indications of the results of the moderation of the binned blog comments by the second and third device and generating bid metrics in response to the comparison.

8. The method of claim 7, further comprising receiving a first bid from the second device for moderating a set of binned blog comments and a second bid from the third device for moderating a set of binned blog comments, and selecting one of the second and third devices for outsourcing blog comment moderation in response to the generated bid metrics.

9. The method of claim 8, wherein the second device is arranged to host a blog comment reviewing service.

10. The method of claim 9, wherein the third device is arranged to host a blog comment reviewing service that is different from the blog comment reviewing service that is associated with the second device, wherein the first, second, and third devices are addressed using domain names that are different.

11. The method of claim 4, further comprising:
determining a metric associated with the second device in response to the protective action indicated by the second device; and
selecting the second device as a blog comment reviewing service in response to the determined metric associated with the second device, wherein the determined metric associated with the second device is determined in response to feedback received from a blog host associated with a blog in which one or more of the binned blog comments were posted.

12. A non-transitory, tangible medium including instructions that, when executed on a processor of an electronic system, comprise:
selecting a third party service provider and sending the third party service provider a type of commonality of identified adverse elements of binned blog comments;
selecting a protective action in response to an analysis of at least one of the identified adverse elements of the indicated binned blog comments;
sending an indication of the protective action to a device that is arranged to store at least one blog from which a plurality of the binned blog comments originated;
transmitting a networked communication that includes an indication of the protective action selected in response to the analysis of the at least one of the identified adverse elements, wherein the networked communication includes moderated blog comments generated in response to the selected protective action and the indicated binned blog comments;
generating a risk assessment rating for the indicated blog comments that is determined in response to one or more rules of a rule-base, wherein the one or more rules are selected in response to a type of commonality of the identified adverse elements of the identified binned blog comments; and
examining header information associated with a blog posting used to post at least one of the identified bin blog comments, wherein the header information is examined for Hypertext Transfer Protocol Referer information that indicates that the referring page used to generate the blog posting is a search engine result page.

13. The medium of claim 12, further comprising automatically moderating the binned blog comments in response to the selected protected action.

14. The medium of claim 13, further comprising automatically applying the selected protective action to at least one of the indicated binned blog comments.

15. The medium of claim 14, further comprising applying the selected protective action to each of the indicated binned blog comments.

16. A resource provider, comprising:
a memory that includes a comment queue that is arranged to receive from a second device an indication of binned blog comments having a commonality of identified adverse elements amongst the binned blog comments; and
a processor for executing a moderation tool that is arranged to select the second device, to send to the second device a type of commonality of identified adverse elements of the indicated binned blog comments, and to select a protective action in response to an analysis of at least one of the identified adverse elements of the indicated binned blog comments, wherein the resource provider is arranged to transmit a networked communication that includes an indication of the protective action selected in response to the analysis of the at least one of the identified adverse elements, wherein the networked communication includes moderated blog comments generated in response to the selected protective action and the indicated binned blog comments, wherein the analysis includes generating a risk assessment rating for the indicated blog comments that is determined in response to one or more rules of a rule-base, wherein the one or more rules are selected in response to a type of commonality of the identified adverse elements of the identified binned blog comments, wherein the rule-base is arranged to examine header information associated with a blog posting used to post at least one of the identified bin blog comments, and wherein the rule-base is arranged to examine the header information for Hypertext Transfer Protocol Referer information that indicates that the referring page used to generate the blog posting is a search engine result page.

17. The resource provider of claim 16, wherein the rule-base is arranged to determine the risk assessment rating in response to a determination of whether the blog posting used to post at least one of the identified bin blog comments originated from a trusted zone.

18. The resource provider of claim 17, wherein the rule-base is arranged to determine the risk assessment rating in response to a determination of whether the blog posting used to post at least one of the identified bin blog comments originated from an address that is associated with a likely source of blog comments having adverse elements.

19. The resource provider of claim 16, wherein the selected protective action is applied to a plurality of blog comments associated with the identified binned blog comments.

* * * * *